United States Patent [19]
Bacher et al.

[11] Patent Number: 6,102,184
[45] Date of Patent: Aug. 15, 2000

[54] DISC WITH FRICTION LINING FOR MECHANICAL CLUTCH

[75] Inventors: Michel Bacher, Andilly; luc Federzoni, Vicq sur Breuilh, both of France

[73] Assignee: Valeo, Paris, France

[21] Appl. No.: 09/194,116

[22] PCT Filed: Mar. 27, 1998

[86] PCT No.: PCT/FR98/00632

§ 371 Date: Feb. 23, 1999

§ 102(e) Date: Feb. 23, 1999

[87] PCT Pub. No.: WO98/44272

PCT Pub. Date: Oct. 8, 1998

[30] Foreign Application Priority Data

Mar. 27, 1997 [FR] France .................................. 97 03764

[51] Int. Cl.[7] .................................................... F16D 13/64

[52] U.S. Cl. ........................................ 192/107 C; 192/52.6

[58] Field of Search ............................ 192/107 C, 107 R, 192/52.6

[56] References Cited

U.S. PATENT DOCUMENTS

4,529,079 7/1985 Albertson ............................. 192/107 C
5,601,173 2/1997 Thirion De Briel et al. ...... 192/107 C

*Primary Examiner*—Richard M. Lorence
*Attorney, Agent, or Firm*—Liniak, Berenato, Longacre & White

[57] ABSTRACT

The linings are fixed on fixing zones (4a, 4b) of the blades (3a, 3b) constituting the disc peripheral region (2) by one or several adhesive beads (9) extending in the proximity of the edges of each of said fixing zones (4a, 4b), inside the latter. The invention is applicable to motor vehicle clutches.

5 Claims, 1 Drawing Sheet

DISC WITH FRICTION LINING FOR MECHANICAL CLUTCH

FIELD OF THE INVENTION

The present invention concerns a disc with friction linings for a mechanical clutch, the disc having in a peripheral region surrounding a central part fixing zones generally parallel to the plane of said central part, on the one hand for a first lining that is annular or divided into segments and adapted to come into friction contact with the pressure plate of the clutch and on the other hand for a second lining that is also annular or divided into segments and adapted to come into friction contact with the reaction plate of the clutch.

Said peripheral region of the disc can be annular and continuous but is routinely divided into radial blades carrying the aforementioned fixing zones, the blades being joined to the central part of the disc by a root and serving alternately for fixing the first lining and for fixing the second lining. The blades can be in one piece with the central part of the disc or riveted to it. The blades for fixing one lining can be a different shape than the blades for fixing the other lining and the shapes can vary within very wide limits depending on the required effect or on manufacturing imperatives.

The blades can also all have the same shape, for example a flag shape, and be positioned alternately to offer fixing zones serving alternately for fixing one of the linings and for fixing the other lining.

DESCRIPTION OF THE RELATED ART

Examples of blades of these various types are given in European Patent Application 0 579 554 (U.S. Pat. No. 5,452,783) and in French Patent Application 2 370 893. To make the fixing of the linings more rigid and to achieve more regular wear of the linings, without indentations, it is customary to provide additional bearing zones on each blade, for example on respective opposite sides of its fixing zone for the lining concerned, offset towards the other lining and serving as a support for it. This is the case in the aforementioned two documents. This being the case, the function of a friction disc of the above kind for a mechanical clutch, the widest field of application of which is naturally to motor vehicles, is sufficiently well known to the technician in this art not to require description. For more information reference may be had to the aforementioned documents. Suffice to say that when the clutch is engaged the drive torque is transmitted from a driven shaft via the friction disc, the friction linings of which are clamped between the pressure plate and the reaction plate of the clutch.

The present invention is more particularly concerned with fixing the linings to the blades of the discs.

The problem has two aspects:

1) the presence on the blades of additional bearing zones, referred to above, causes a tendency for the blades to flex in their central part when they loaded between the pressure and reaction plates or for glueing. Consequently, the support offered by the blades to the lining tends to be concentrated on the bends, whether the blades and linings are glued or riveted together, with the risk of imprints on the linings;

2) when they are fixed by glueing, the problem arises of delimiting the blade surface to which the adhesive is applied. The adhesive is applied in droplets concentrated in the middle of the blade. Assembly is then achieved by applying a pressure of 20 bars to the blade; as a result the adhesive spreads over an irregular surface with undefined contours which can be controlled, to some degree, only by carefully adjusting the parameters (quantity of adhesive and pressure).

Given the above conditions, it frequently happens that the adhesive spills over onto the blade, beyond its surface that should be in contact with the lining. If the fixing zone of the blade, and this applies in particular to tripod blades, incorporates bends to produce additional bearing zones, the adhesive may even spread over onto the bends, which compromises their function by stiffening them, and can even lead to the risk of flash causing jamming.

SUMMARY OF THE INVENTION

The aim of the present invention is to eliminate the above drawbacks and to this end a disc with friction linings of the general type defined at the beginning of this description is characterised in that said linings are fixed to said peripheral region by one or more adhesive beads inside and near the edges of each of said fixing zones.

Accordingly, the adhesive will be essentially located in the zones where the pressure will be greatest when said fixing zones are pressed onto the linings, avoiding the central part of the fixing zones, where the pressure is lower and where the adhesive could even be subjected to tearing off forces.

When the fixing zones have a shape with four corners, for example a trapezium shape, the disc can be further characterised by the presence of at least two adhesive beads near two opposite edges of each of said fixing zones and even by the presence of two pairs of adhesive beads near respective pairs of opposite edges of each of said fixing zones.

A peripheral adhesive bead inside and near the edges of each of said fixing zones could equally be provided.

When, as mentioned above, said peripheral region is divided into blades including bend zones separating a central part from additional bearing zones, said fixing zones can be in said central parts of respective blades One embodiment of the invention will now be described by way of non-limiting example and with reference to the figures of the accompanying drawing, in which:

DESCRIPTION OF THE PREFERRED EMBODIMENT

Figure 1:
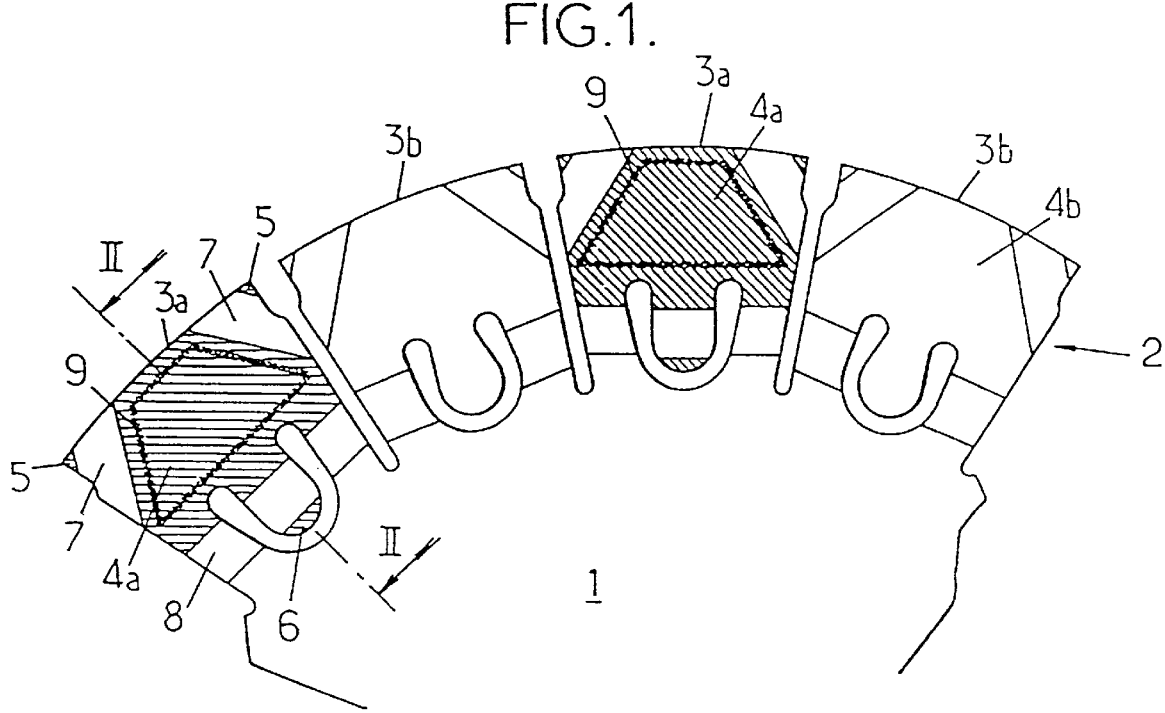
FIG. 1 is a partial front view of the peripheral region of a disc with friction linings in accordance with the invention of the type with cut-out blades known as "tripod" blades.
Figure 2:
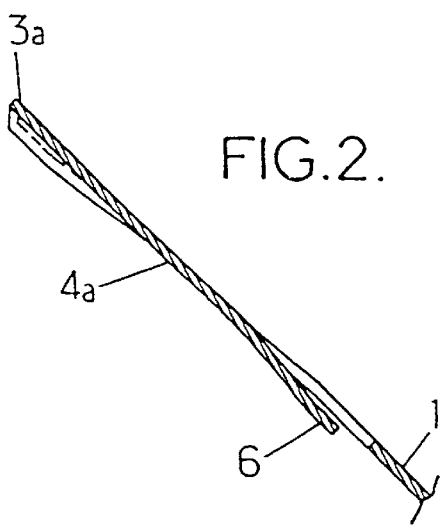
FIG. 2 is a view in radial section taken along the line II—II in FIG. 1.

In FIG. 1, which represents a clutch disc sector, the disc having a central part 1 and a peripheral part 2, the peripheral part is divided into a number of alternating blades 3a and 3b, the blades 3a being adapted to be attached to one of the opposed friction linings of the clutch disc and the blades 3b being adapted to be attached to the other friction lining. On each blade there is shown each zone 4a, 4b for fixing the blade to the corresponding lining, which zone is generally trapezium-shaped, the blades also being trapezium-shaped. The fixing zones 4a, which are on the side facing the viewer, are shown shaded. Although this is not directly relevant to the invention, note that the blades have additional bearing zones for the lining concerned at their two outside corners and likewise at the end of a cut-out central internal tongue; these bearing zones 5 and 6 are shown for one of the blades 3a. They are separated from the central fixing zone 4a by respective bend zones 7 and 8 (this is known in itself).

The bend zones 8 are perpendicular to the radial axis of symmetry of the blades 3a, 3b and are referred to as tangential zones. They are part of the root of the blade 3a, 3b and are attached to the central part 1 adapted to be coupled rigidly or resiliently to a hub adapted to be keyed to a driven shaft to rotate with it.

The zones 8 are part of the lower radial edge of the blades.

The bend zones 7 are oblique to the radial axis of symmetry of the blades and end on the top radial edge of the blade 3a, 3b and on one of the lateral edges of the blade 3a, 3b.

This being the case, in accordance with the invention, for attaching each fixing zone 4a, 4b to the corresponding lining, an adhesive bead 9 is deposited on each of the above zones. In the FIG. 1 example the bead is peripheral, i.e. it follows a closed path inside and near the edges of the fixing zone concerned (zone 4a in the drawing). As a result, when pressure is applied the adhesive will not reach the bend zone 7, 8 and a substantial saving in adhesive is obtained by not putting any in the central part of the fixing zones: the adhesive is therefore localised to the part of the blade where it can be the most effective because it can be subjected to the highest pressure and deformed least when the linings are pressed onto the disc. Because of the forces on the blades, and because of their central deformation, the pressure is much lower in the central part and higher near the edges of the fixing zones.

For the above reasons, and provided that adhesive is deposited only inside and along the edges of the fixing zones, the bead 9 can be interrupted at the corners in which case it will be in the form of two opposed pairs of beads or, at the very least, two opposed beads along the bend zones.

In the embodiment shown the blades 3a, 3b have a fixing zone 4a, 4b at their inside periphery, at the level of the tangential bend 8 perpendicular to the radial axis of symmetry. They have three fixing zones 4a, 5, 6 at their outside periphery because of the presence of the bend zones 7 oblique to the radial axis of symmetry of a blade. This is not necessarily the case; for example, the blade could comprise no tangential bend and have a fixing zone in the plane of the central part, as in FIG. 6 of document FR-A-2 730 893. The adhesive is then applied to this fixing zone and to the other fixing zone extending from the outside periphery to the inside periphery of the blade. As an alternative, each blade can have three beads, i.e. one bead per bend 7, 8 and parallel thereto.

In another variant, the bead associated with the bend 8 can be local and central to the zone delimited by the U-shaped slot (no reference number) also encroaching on the bend 8.

The fixing zones 4a, 4b can be provided with holes so that blades to which the friction linings are riveted can be used. The holes are usually at a distance from the edges of the fixing zones. Because of the adhesive beads, in accordance with the invention, the holes are not a problem and as a result the clutch disc can be standardised.

What is claimed is:

1. A disc with friction linings for mechanical clutch having in a peripheral region surrounding a central part and divided into radial blades (3a, 3b) with fixing zones generally parallel to the plane of said central part, on the one hand for a first lining that is annular or divided into segments and adapted to come into friction contact with a pressure plate of the clutch and on the other hand for a second lining that is also annular or divided into segments and adapted to come into friction contact with a reaction plate of the clutch, wherein the fixing zones are delimited by at least two bend zones (7, 8), said linings are fixed to said peripheral region (2) by one or more adhesive beads (9) inside and near the edges of each of said fixing zones (4a, 4b).

2. A disc according to claim 1, wherein said fixing zones (4a, 4b) have a shape with four corners, wherein at least two adhesive beads are disposed near two opposite edges of each of said fixing zones (4a, 4b).

3. A disc according to claim 2 wherein two pairs of adhesive beads are disposed near respective pairs of opposite edges of each of said fixing zones (4a, 4b).

4. A disc according to claim 1, wherein said fixing zones (4a, 4b) have a shape with four corners, wherein at least one peripheral adhesive dead (9) is disposed inside and near the edges of each of said fixing zones (4a, 4b).

5. A disc according to claim 1 wherein said peripheral region is divided into blades (3a, 3b) including bend zones (7, 8) separating a central part from additional bearing zones (5, 6), wherein said fixing zones (4a, 4b) are in said central parts of respective blades.

* * * * *